United States Patent
Bright

(10) Patent No.: US 10,115,053 B2
(45) Date of Patent: *Oct. 30, 2018

(54) NFC/RF MECHANISM WITH MULTIPLE VALID STATES FOR DETECTING AN OPEN CONTAINER, AND METHODS OF MAKING AND USING THE SAME

(71) Applicant: Thin Film Electronics ASA, Oslo (NO)

(72) Inventor: Matthew A. Bright, San Jose, CA (US)

(73) Assignee: Thin Film Electronics ASA, Oslo (NO)

(*) Notice: Subject to any disclaimer, the term of this patent is extended or adjusted under 35 U.S.C. 154(b) by 0 days.

This patent is subject to a terminal disclaimer.

(21) Appl. No.: 15/826,539

(22) Filed: Nov. 29, 2017

(65) Prior Publication Data

US 2018/0089552 A1 Mar. 29, 2018

Related U.S. Application Data

(63) Continuation of application No. 15/344,011, filed on Nov. 4, 2016, now Pat. No. 9,846,835, which is a (Continued)

(51) Int. Cl.
G08B 13/14 (2006.01)
G06K 19/077 (2006.01)
(Continued)

(52) U.S. Cl.
CPC .......... *G06K 19/07798* (2013.01); *A61J 1/00* (2013.01); *B65D 27/30* (2013.01); *B65D 55/028* (2013.01);
(Continued)

(58) Field of Classification Search
CPC .................................. G06K 1/00; A61J 1/00
See application file for complete search history.

(56) References Cited

U.S. PATENT DOCUMENTS 5,939,984 A 8/1999 Brady et al.
6,574,166 B2 6/2003 Niemiec
(Continued)

FOREIGN PATENT DOCUMENTS

DE 10012204 A1 9/2001
DE 102011050196 A1 11/2011
(Continued)

OTHER PUBLICATIONS

Ghislain Boiron et al.; "Hybrid Anti-Counterfeit Label"; Bibliographic Data of WO2016066925 (A1); May 6, 2016; http://worldwide.espacenet.com.
(Continued)

*Primary Examiner* — Shirley Lu
(74) *Attorney, Agent, or Firm* — Andrew D. Fortney; Central California IP Group, P.C.

(57) ABSTRACT

A wireless (e.g., near field or RF) communication device, and methods of manufacturing and using the same are disclosed. The wireless communication device includes a receiver and/or transmitter, a substrate with an antenna thereon, an integrated circuit, and one or more protection lines. The antenna receives and/or transmits or broadcasts a wireless signal. The integrated circuit processes the wireless signal and/or information therefrom, and/or generates the wireless signal and/or information therefor. The integrated circuit has a first set of terminals electrically connected to the antenna. The protection line(s) are on a common or different substrate as the antenna. The protection line(s) sense or determine a continuity state of a package or container on which the communication device is placed or to which the communication device is fixed or adhered, and are electrically connected to a second set of terminals of the integrated circuit different from the first set of terminals.

20 Claims, 3 Drawing Sheets

Related U.S. Application Data continuation of application No. 14/820,378, filed on Aug. 6, 2015, now Pat. No. 9,519,904.

(60) Provisional application No. 62/065,674, filed on Oct. 19, 2014.

(51) Int. Cl.
| | | |
|---|---|---|
| *H04B 5/00* | (2006.01) | |
| *G06Q 30/00* | (2012.01) | |
| *A61J 1/00* | (2006.01) | |
| *B65D 79/02* | (2006.01) | |
| *B65D 27/30* | (2006.01) | |
| *B65D 55/02* | (2006.01) | |
| *G06K 1/00* | (2006.01) | |

(52) U.S. Cl.
CPC ......... *B65D 79/02* (2013.01); *G06Q 30/0185* (2013.01); *H04B 5/0062* (2013.01); *B65D 2203/10* (2013.01); *G06K 1/00* (2013.01)

(56) References Cited

U.S. PATENT DOCUMENTS

| | | |
|---|---|---|
| 6,628,199 B1 | 9/2003 | Ehrensvard et al. |
| 7,178,417 B2 | 2/2007 | Petersen et al. |
| 7,183,924 B1 | 2/2007 | Ku |
| 7,304,578 B1 | 12/2007 | Sayers et al. |
| 7,556,532 B2 | 7/2009 | Lee et al. |
| 7,876,222 B2 | 1/2011 | Calvarese |
| 7,924,158 B2 | 4/2011 | Schuler et al. |
| 7,937,829 B2 | 5/2011 | Petersen et al. |
| 8,686,861 B2 | 4/2014 | Chung et al. |
| 8,878,654 B2 | 11/2014 | Cohen-Alloro et al. |
| 8,884,764 B2 | 11/2014 | Forster |
| 9,004,366 B2 | 4/2015 | Smith et al. |
| 2002/0017996 A1 | 2/2002 | Niemiec |
| 2002/0188259 A1 | 12/2002 | Hickle et al. |
| 2004/0125972 A1* | 7/2004 | Boor .................. H04R 25/502 381/312 |
| 2005/0051624 A1 | 3/2005 | Kipp et al. |
| 2005/0218233 A1 | 10/2005 | Petersen et al. |
| 2006/0152364 A1 | 7/2006 | Walton |
| 2009/0095818 A1* | 4/2009 | Smith .............. G06K 19/07749 235/492 |
| 2010/0164710 A1 | 7/2010 | Chung et al. |
| 2012/0154120 A1* | 6/2012 | Alloro ................. G06F 19/3462 340/10.1 |
| 2013/0307683 A1 | 11/2013 | Greenberg et al. |
| 2014/0158574 A1 | 6/2014 | Forbes |
| 2015/0254961 A1 | 9/2015 | Brandl |
| 2016/0027022 A1 | 1/2016 | Benoit et al. |

FOREIGN PATENT DOCUMENTS

| | | |
|---|---|---|
| WO | 2005024745 A2 | 3/2005 |
| WO | 2006002667 A1 | 1/2006 |
| WO | 2006102678 A1 | 9/2006 |
| WO | 2014167309 A1 | 10/2014 |
| WO | 2016055290 A2 | 4/2016 |
| WO | 2016055305 A1 | 4/2016 |
| WO | 2016055351 A1 | 4/2016 |
| WO | 2016066925 A1 | 5/2016 |

OTHER PUBLICATIONS

Extended European Search Report dated Mar. 3, 2016; European Patent Application No. 15187256.1; 11 pages; European Patent Office; Munich, Germany.

International Search Report and Written Opinion; International Searching Authority/US dated Jan. 5, 2016; International Application No. PCT/US2015/56087; 8 pages; International Searching Authority/United States, Commissioner for Patents; Alexandria, Virginia.

Claire Swedberg; "Information Mediary Corp. Developing NFC Version of Its Drug-Tracking Products"; Nov. 14, 2012; 4 pages; Obtained from www.rfidjournal.com.

SL3S1203_1213 Product Data Sheet; Mar. 17, 2014; Rev 4.4; 37 pages; NXP Semiconductors N.V.; http://www.nxp.com.

SL3S1203_1213 Product Data Sheet; Nov. 24, 2011; Rev 3.7; 43 pages; NXP Semiconductors N.V.; http://www.nxp.com.

SL3S1203_1213 Product Short Data Sheet; Jan. 31, 2011; Rev 3.3; 23 pages; NXP Semiconductors N.V.; http://www.nxp.com.

\* cited by examiner

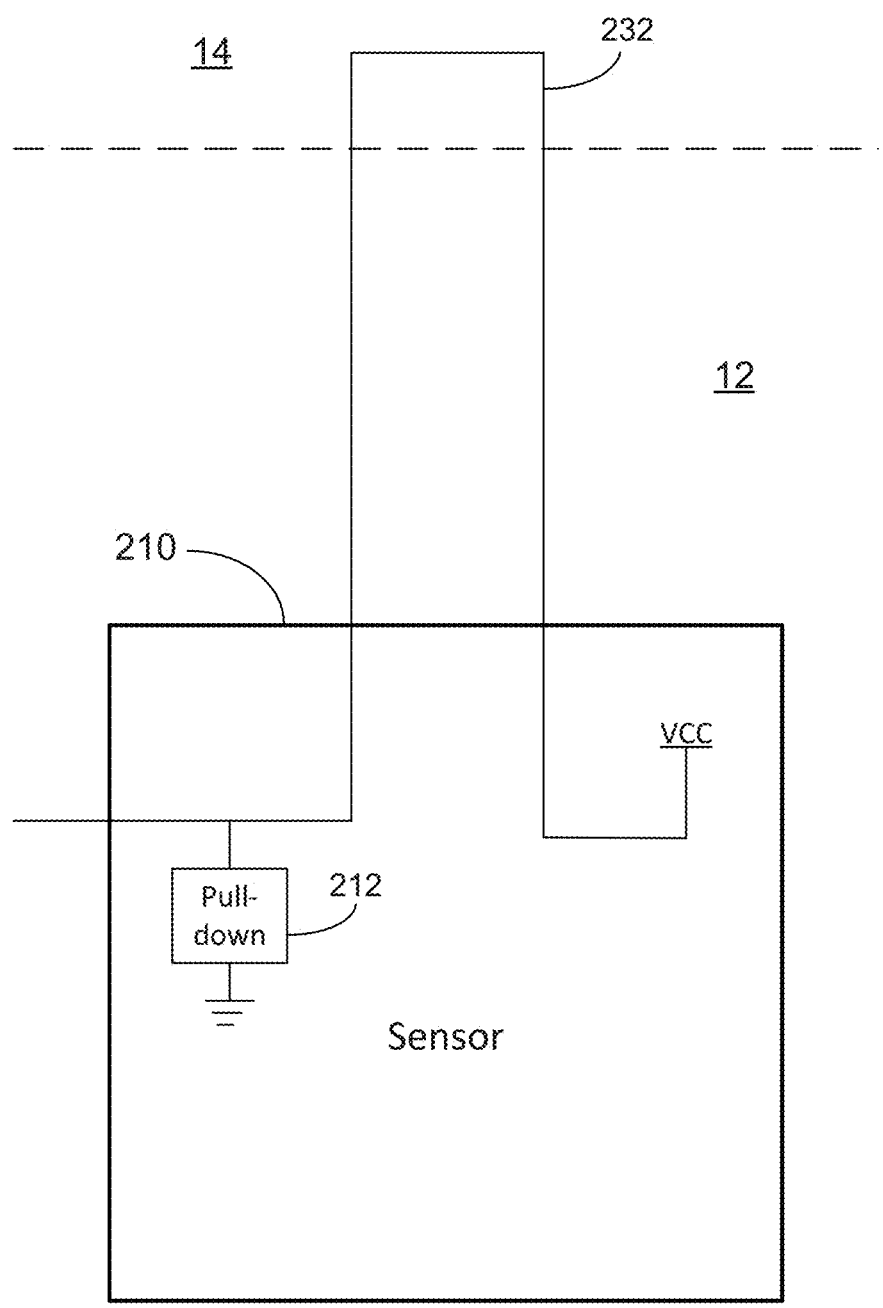

NFC/RF MECHANISM WITH MULTIPLE VALID STATES FOR DETECTING AN OPEN CONTAINER, AND METHODS OF MAKING AND USING THE SAME

CROSS REFERENCE TO RELATED APPLICATIONS

This application is a continuation of U.S. application Ser. No. 15/344,011, filed Nov. 4, 2016, pending, which is a continuation of U.S. application Ser. No. 14/820,378, filed Aug. 6, 2015, now U.S. Pat. No. 9,519,904, which claims the benefit of U.S. Provisional Pat. Appl. No. 62/065,674, filed on Oct. 19, 2014, all of which are incorporated herein by reference as if fully set forth herein.

FIELD OF THE INVENTION

The present invention generally relates to the field(s) of near field and radio frequency communication. More specifically, embodiments of the present invention pertain to radio frequency (RF and/or RFID) and near field communication (NFC) tags and devices with a mechanism for detecting an open container while preserving the ability of the tags and devices to communicate wirelessly, and methods of manufacturing and using the same.

DISCUSSION OF THE BACKGROUND

Counterfeiting and diversion (sale of a product outside authorized regions or distributors, also known as 'gray market activity') are two common problems impacting global supply chains and global brands. Apart from the obvious loss of revenue from the sale of genuine products, brands are negatively impacted by counterfeiting when an unknowing consumer loses confidence in a product's quality or safety. In the case of gray market activity, the brand company might receive revenue for the sale of genuine product in an area where it is not distributed, but the unauthorized sales could compromise country- and region-specific pricing. In addition, taxing authorities might not be properly reimbursed if product is sold outside the intended region. This potential loss of revenue makes governments stakeholders, as well.

Product manufacturers often turn to different technology to protect against counterfeiting and diversion. Holograms are very common, can be read in the field, but are increasingly easy to forge. Sophisticated 'forensic' types of verification generally require shipment of questionable product to a certified lab for analysis and verification, meaning that it such methods cannot be used for real-time, in-field analysis and decision making.

In order to overcome the limitations of holograms and enhance the level of security while preserving the ability to verify authenticity in the field (for example, at customs inspection, at a retail store, in a restaurant), manufacturers of certain products, including premium products such as alcoholic beverages and potentially tobacco, premium fragrances, and cosmetics, look to wireless solutions that combine RFID tags with reader devices. One particularly convenient implementation—due to the wide availability of NFC-capable smartphones (500 million in use by 2014 and 1 billion to be sold worldwide from 2014 and 2015) combines NFC (13.56 MHz High Frequency (HF) RFID) tags with NFC-capable smartphones. In this implementation, NFC tags are placed in such a way that opening the protected product destroys the NFC tag, generally by breaking the antenna in some way (for example, poking the antenna with a corkscrew or twisting and breaking the antenna in the act of opening a screw-top container). This means that cloud services that authenticate protected items based on the NFC tag's ID cannot be used after the protected item has been opened.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to near field communication (NFC) and radio frequency (RF and/or RFID) tags and devices with a mechanism for detecting an open container that also preserves the ability of the tags and devices to communicate wirelessly after the container is opened, and methods of manufacturing and using the same.

In one aspect, the present invention relates to a wireless (e.g., near field or RF) communication device, comprising a receiver and/or transmitter, a substrate with an antenna thereon, an integrated circuit, and one or more protection lines. The antenna receives and/or transmits or broadcasts a wireless signal. The integrated circuit processes the wireless signal and/or information therefrom, and/or generates the wireless signal and/or information therefor.

The integrated circuit has a first set of terminals electrically connected to the antenna. The protection line(s) are on a common or different substrate as the antenna. The protection line(s) sense or determine a continuity state of a package or container on which the communication device is placed or to which the communication device is fixed or adhered, and are electrically connected to a second set of terminals of the integrated circuit different from the first set of terminals. In some embodiments, the wireless communication device comprises a near field and/or radio frequency communication device.

In various embodiments, the protection line(s) comprise a plurality of protection lines. For example, the wireless communication device may comprise one or more main protection lines and one or more redundant protection lines.

In the present wireless communication device, the integrated circuit may comprise one or more printed layers (e.g., a plurality of printed layers), a plurality of thin films, or one or more thin films and one or more printed layers.

The antenna may consist of a single metal layer. In one embodiment, the antenna and the protection lines consist of a single common metal layer on a common substrate.

The integrated circuit in the present wireless communication device may further comprise a continuity sensor electrically connected to at least one of the protection line(s). For example, the continuity sensor may comprise (i) a voltage corresponding to high digital logic state electrically coupled to an end of one of the protection line(s), and (ii) a pull-down circuit that drives an output node of the continuity sensor to a logic low state when the one protection line is broken. The pull-down circuit may comprise a resistor or resistor-wired transistor connected at one terminal to the output node of the continuity sensor and to the protection line(s), and at an opposite terminal to a ground voltage.

In various embodiments of the present wireless communication device, the integrated circuit further comprises a second sensor. In such embodiments, the integrated circuit may further comprise a threshold comparator receiving an output of the second sensor.

In further embodiments of the present wireless communication device, the integrated circuit may further comprise a memory including one or more bits configured to store a value corresponding to a continuity state of the container or package. Alternatively or additionally, the memory may include one or more bits configured to store a value corresponding to an output of the threshold comparator. Alternatively or additionally, the memory may include a plurality of bits configured to store a unique identification code for the container or package.

The present wireless communication device may comprise a transmitter (e.g., a modulator), a receiver (e.g., a demodulator), or both.

The invention also contemplates a package or container, having first and second separable parts with an interface therebetween, and the wireless communication device, on the first and second separable parts of the package or container, and over the interface. For example, the first separable part of the package or container may comprise a bottle or jar, and the second separable part may comprise a cap or lid corresponding to and/or configured to mate with the bottle or jar. Alternatively, the first and second separable parts of the package or container may comprise first and second flaps on a box (e.g., that can be sealed using packaging or other tape), or the tray and a corresponding lid of a box or carton. The first and second separable parts of the package or container can also be the flap and the back of an envelope or other thin, relatively flat shipping container. The integrated circuit and the antenna are on the first separable part of the package or container, and the one or more protection lines are on each of the first and second separable parts of the package or container. In the present package or container, the integrated circuit and the antenna may be on the first separable part of the package or container, and the protection line(s) may be on each of the first and second separable parts of the package or container.

In another aspect, the present invention relates to a method of manufacturing a wireless (e.g., near field or RF) communication device, comprising forming an antenna on a first substrate, the antenna being configured to receive and/or transmit or broadcast a wireless signal; forming one or more protection lines on a common or different substrate; forming an integrated circuit on a substrate common with at least one of the antenna and the protection line(s), or different from each of the antenna and the protection line(s); and electrically connecting the antenna to a first set of terminals of the integrated circuit, and the protection line(s) to a second set of terminals of the integrated circuit.

In some embodiments, the wireless communication device comprises a near field and/or radio frequency communication device. Additionally or alternatively, forming the protection lines comprises forming a plurality of the protection lines (e.g., one or more main protection lines and one or more redundant protection lines). The redundant protection line(s) may be formed on the same substrate as the main protection line(s).

In the present method, forming the integrated circuit may comprise printing one or more layers of the integrated circuit. Additionally or alternatively, the method may comprise printing a plurality of the layers of the integrated circuit, forming a plurality of layers of the integrated circuit by one or more thin film processing techniques, or forming one or more layers of the integrated circuit by a thin film processing technique and printing one or more additional layers of the integrated circuit.

In further embodiments, forming the antenna may consist of forming a single metal layer on the first substrate, and etching the single metal layer to form the antenna. Alternatively, forming the antenna may comprise printing a metal ink on the first substrate in a pattern corresponding to the antenna. In any case, the antenna and the protection lines may consist of a single common metal layer on a common substrate. Alternatively, the antenna may consist of a first metal layer on a first surface of a substrate, and the protection line(s) may consist of a second metal layer on a second surface of the substrate opposite from the first surface.

In variations of the method, the integrated circuit may further comprise a sensor, and electrically connecting the protection line(s) to the integrated circuit may comprise electrically connecting the protection line(s) to the sensor. As for the wireless communication device, the integrated circuit may further comprise a threshold comparator configured to receive an output of the sensor.

Similar to the wireless communication device, forming the integrated circuit may further comprise forming a memory including one or more bits configured to store a value corresponding to a continuity state of the container or package. In the present method, the memory may (further) include a plurality of bits configured to store a unique identification code for the container or package. In some embodiments, forming the memory may comprise printing at least one layer of the memory that includes the plurality of bits configured to store a unique identification code for the container or package.

In a still further aspect, the present invention relates to a method of detecting an opened package or container, comprising placing a wireless communication device comprising an antenna, one or more protection lines, and an integrated circuit electrically connected to each of the antenna and the protection line(s) on the package or container such that at least one of the protection line(s) are over an interface between first and second separable parts of the package or container; and using the integrated circuit, sensing a continuity state of the package or container.

In the method of detecting an opened package or container, the wireless communication device may comprise a near field and/or radio frequency communication device.

Furthermore, the integrated circuit and the antenna may be on the first separable part of the package or container, and the protection line(s) may be on each of the first and second separable parts of the package or container.

In some embodiments, the protection lines may comprise a plurality of the protection lines (e.g., one or more main protection lines and one or more redundant protection lines). The redundant protection line(s) may be on the same substrate as the protection line(s).

As for the wireless communication device, in the method of detecting an opened package or container, the integrated circuit may comprise one or more printed layers. Alternatively, the integrated circuit may comprise a plurality of thin films, or one or more thin films and one or more printed layers. The antenna may consist of a single metal layer. For example, the antenna and the protection lines may consist of a single common metal layer on a common substrate.

As for the wireless communication device, in the method of detecting an opened package or container, the integrated circuit may further comprise a sensor electrically connected to the protection line(s). In addition, the integrated circuit may further comprise a threshold comparator receiving an output of the sensor.

In the method of detecting an opened package or container, the integrated circuit may further comprise a memory including one or more bits configured to store a value corresponding to the continuity state of the container or package. Additionally or alternatively, the memory may include a plurality of bits configured to store a unique identification code for the container or package. Furthermore, the memory may comprise at least one printed layer in the plurality of bits configured to store a unique identification code for the container or package.

In the method of detecting an opened package or container, the continuity state of the package or container is determined to be opened when at least one of the protection line(s) is broken. Alternatively or additionally, the continuity state of the package or container may be determined to be closed or sealed when one or more of the protection lines is not broken.

As a result, the present invention may expand the use and functionality of near field communication and RF tags and devices. The novel tags and devices enable continued use of the tags and devices to communicate information about the product in the container or package after the container or package has been opened. These and other advantages of the present invention will become readily apparent from the detailed description of various embodiments below.

BRIEF DESCRIPTION OF THE DRAWINGS

FIG. 4 shows an exemplary continuity sensor circuit for use in the present NFC/RF tag.

DETAILED DESCRIPTION

Figure 1:
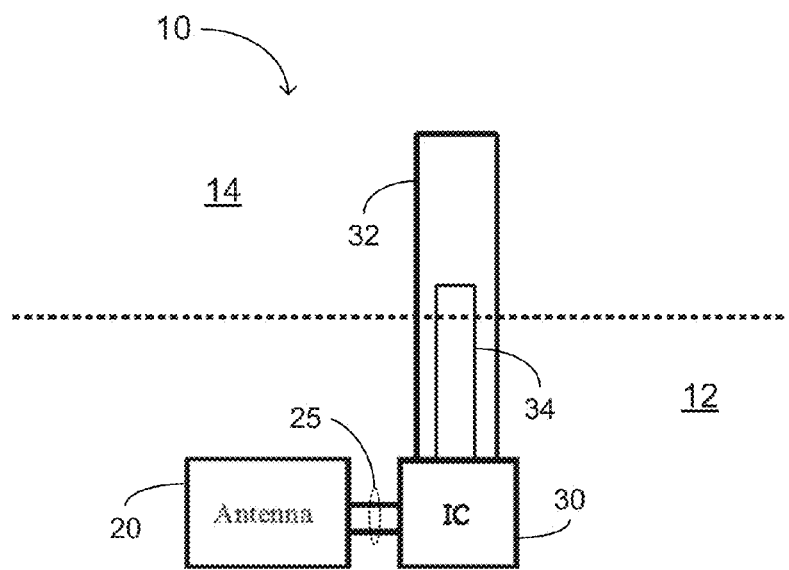
FIG. 1 shows an exemplary NFC/RF tag with protection lines for sensing whether a container bearing the tag has been opened, in accordance with one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The present invention solves the problem in conventional solutions where the NFC tag cannot be read after the protected product is opened. The invention allows reading the tag prior to opening the protected product (to verify that it has been unopened) and after opening the product, and trigger a different NFC user experience when the product is detected as having been opened. Product manufacturers, distributors, resellers, and consumers all have interest in the ability to read the tag after opening, for example, to access product recall notices, read product instructions and marketing information, easily contact support or warranty services, or to easily trigger product re-orders or orders of related consumables or accessories.

Furthermore, the present invention adds minimal to no cost to a standard NFC and/or RF identification tag implementation, such as the NFC Barcode™ tag, available from Thin Film Electronics, Oslo, Norway. Because the security lines are manufactured at the same time that the rest of the antenna is manufactured (for example, using aluminum etching or screen printing), there are no additional steps and very little to no incremental material costs. In one simple embodiment, the antenna metal layer design is adjusted to add some additional metal lines (which are NOT part of the antenna coil) that are broken as part of the container opening process. The additional metal lines (called "protection lines" herein) are electrically separate from the antenna coil and may be partially or completely implemented on the side of the antenna substrate material opposite the antenna coil. The protection lines make electrical contact to the IC in the NFC and/or RFID tag so that the IC can detect whether the protection lines are intact (or "closed", the default state at manufacturing) or broken (or "open", after the protected product has been opened). The antenna substrate material, such as paper or plastic, may be mechanically scored to facilitate breaking the protection lines when the protected product is open.

The present invention may use a combination of ROM bits (typically as a unique ID) and sensor bits, and contemplates electrical continuity sensing ("continuity" meaning that an electrical connection is intact) as a state of the container and/or a form of "barcode". When read by an NFC-capable smart phone or other reading device, the NFC and/or RFID tag's memory bits allocated to sensor data will indicate whether the metal protection line(s) are intact or broken.

Exemplary Wireless (e.g., NFC and/or RF) Device(s)

FIG. 1 shows an exemplary near field communication (NFC) and/or RF device (e.g., an NFC tag) 10 on a container according to the present invention. The device generally comprises a substrate (not shown), an integrated circuit (IC) 30, an antenna 20 in communication with the IC 30, and one or more protection lines 32 in separate communication with the IC 30. Optionally, the NFC device 10 can also have one or more redundant protection lines 34 in separate communication with the IC. This structure and/or device architecture is also applicable to radio frequency (RF) devices, such as RFID tags, high frequency (HF) devices such as roll readers, etc.

Figure 3:
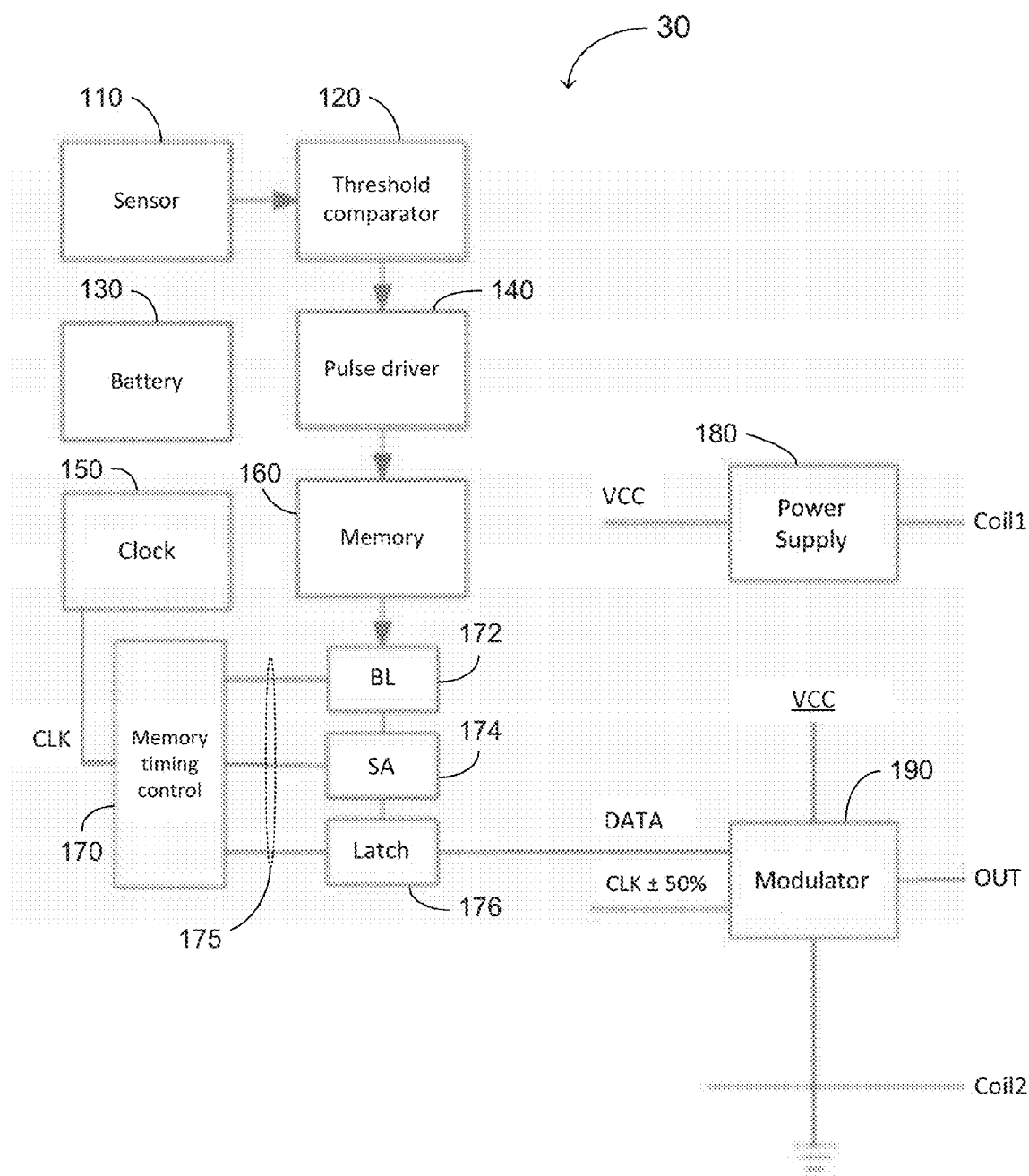
FIG. 3 shows an exemplary integrated circuit for use in the present NFC/RF tag.

As shown in FIG. 3, the IC 30 may include one or more sensors 110, a threshold comparator 120 receiving information (e.g., a signal) from the sensor 110, a pulse driver 140 receiving an output of the threshold comparator 130, a memory 160 storing sensor data from the pulse driver 140, one or more bit lines (BL) 172 for reading data from the memory 160, one or more sense amplifiers (SA) 174 for converting signals on the bit line(s) 172 to digital signals, one or more latches 176 for temporarily storing data from the sense amplifier(s) 174, and a transmitter (e.g., modulator) 190 configured to output data (including identification code) from the device. The exemplary IC 30 in FIG. 3 also contains a clock 150 configured to provide a timing signal (e.g., CLK) that controls the timing of certain operations in the IC 30 and a memory timing control block or circuit 170 that controls the timing of memory read operations. The modulator 190 also receives the timing signal (CLK) from the clock circuit 150, or a slowed-down or sped-up variation thereof. The exemplary IC 30 also includes a power supply block or circuit 180 that provides a direct current signal (e.g., VCC) to various circuits and/or circuit blocks in the IC 30. The memory 160 may also contain identification code. The portion of the memory 160 containing identification code may be printed. The IC 30 may further contain a receiver (e.g., a demodulator), one or more rectifiers (e.g., a rectifying diode, one or more half-bridge or full-bridge rectifiers, etc.), one or more tuning or storage capacitors, etc. Terminals in the modulator 190 and the power supply 180 (which may comprise a half-bridge or full-bridge rectifier) are connected to ends of the antenna (e.g., at Coil1 and Coil2).

For the present continuity sensor, an example 210 of which is shown in FIG. 4, one may simply to connect the protection line(s) 232 to a voltage corresponding to high digital logic state (e.g., an upper power rail VCC or other circuit element connected to a high voltage) in the sensor block 210, as well as to a (weak) pull-down circuit 212 that would drive the node to which it is connected to a logic low state when the protection line(s) 232 are broken. The pull-down circuit 212 may be a resistor or resistor-wired transistor connected at an opposite terminal to a ground voltage. In such a design, no memory bits, and optionally no threshold comparator, are necessary. However, the memory and threshold comparator (e.g., 160 and 120, respectively, in FIG. 3) may be useful for embodiments that include additional sensors.

The memory in the NFC and/or RFID tag may contain a fixed number of bits. In some implementations, NFC and/or RFID tag tags may contain $m*2^n$ bits, where m is a positive integer and n is an integer of at least 3 (e.g., 24, 32, 48, 64, 128, 256 or more bits). Some bits are allocated to overhead (non-payload) data for format identification and data integrity (CRC) checking. The payload of the device consumes the remainder of the bits. For example, the payload can be up to $(m-p)*2^n$ bits, where p is a positive integer<m (e.g., 96 bits in the case where $m*2^n=128$ bits and up to 224 bits in the case where $m*2^n=256$ bits).

The payload of the NFC and/or RFID tag can be allocated to variable amounts of fixed ROM bits (which are generally—but not always—used as a unique identification number). When print methods are used in manufacturing the NFC and/or RFID tag, the ROM bits are permanently encoded and cannot be electrically modified. Any payload bits that are not allocated as fixed ROM bits can be allocated as dynamic sensor bits. These sensor bits can change values, based on a sensed input. Different splits or allocations between ROM and sensor bits are indicated by data format bits that are part of the non-payload or 'overhead' bits, generally in the first $2^n$ bits (or $2^{n-q}$ bits, where q is a positive integer<n, such as 16 bits in the case where $m*2^n=128$ or 256) of the NFC and/or RFID tag memory.

One example of how sensing is implemented in the NFC and/or RFID tag memory involves a sensor that detects when the ambient temperature crosses a set threshold. Upon such an event, one or more sensor bits change state to reflect the temperature threshold crossing. The ROM ID bits do not change, but any data integrity bits (e.g., for CRC) are updated to reflect the state of the sensor bits. Similarly, in the case of continuity sensing (for open-detection applications), one or more sensor bits will change state to indicate that the metal line is broken. This indicates to the reader (e.g., NFC smartphone, etc.) that the protected container has been opened.

In the present application, continuity sensing generally refers to a capability and/or function that senses or determines whether a container has been opened or remains in a closed state (e.g., its factory-sealed condition). In one embodiment, continuity sensing is implemented using one or more protection lines 32, as shown in FIG. 1. The present NFC/RF tag may be thought of as having two parts: a first part that includes the IC 30 and the antenna 20, and a second part that includes the protection line(s) 32. The part of the tag that includes the IC 30 and antenna 20 is on a first part 12 of the protected product and/or package/label. The part of the tag that includes the protection line(s) 32 is at least partially on a second part 14 of the protected product and/or package/label that moves relative to the first part 12 upon opening the product and/or package, so as to break the protection line(s).

For example, in pharmaceutical products, the bottle or jar that contains a drug may be the first part 12 of the product and/or package, and the safety cap may be the second part 14 of the product and/or package. The part of the tag that includes the protection line(s) 32 extends from the IC 30 on the bottle or jar 12 onto the safety cap 14, thereby crossing the interface (indicated by the dashed line) between the bottle or jar 12 and the safety cap 14. When the cap 14 is removed, the protection line 32 is broken, and the sensor in the IC 30 senses or determines an opened state for the container. In a blister pack, separate protection lines extend from the IC (which may be in a region of the blister pack that is typically not opened and in which the foil or plastic film sealing the individual compartments is typically not removed easily) across each of the respective compartments so that the sensor and IC can determine which compartments have been opened (and, in some embodiments, when each opened compartment was opened). In boxed products, a label or tape containing the NFC/RF tag can be placed over an interface between a lid and a tray, or across two flaps that meet and are taped to close and seal the box, such that the IC and antenna are on one component (e.g., the tray or a first flap) and the protection line(s) extend from the one component, across the interface, onto the other component (e.g., the lid or the second flap). Opening the box breaks the protection line(s), and a different continuity state for the container. Similar approaches and/or techniques can be applied to many different types of product containers (e.g., hinged-lid boxes for jewelry, watches, etc., alcohol bottles, cigarette packages, shipping packages such as overnight courier envelopes that can be opened by pulling a string, filament or other durable strip of material, etc.).

In addition to the protection line(s), the present NFC/RF tag may include one or more redundant protection lines 34. The redundant protection line(s) 34 can be used in an "AND"-type function with the protection line(s) 32 (e.g., the IC 30 and sensor sense that the container is opened only when all of the protection lines 32 and redundant protection lines 34 are broken), or in an "OR"-type function with the protection line(s) (e.g., the IC and sensor sense that the container is opened when any of the protection lines 32 or redundant protection lines 34 are broken). Alternatively, the protection lines 32 and redundant protection lines 34 can provide one or more "partially-opened" continuity states when one or more of the protection lines 32 and redundant protection lines 34 are broken and one or more of the protection lines 32 and redundant protection lines 34 are not broken. One skilled in the art can easily derive logic and applications for such functionality and/or capability.

Of course, the IC in the present NFC/RF tag 10 may include one or more sensors in addition to the continuity sensor(s). For example, the IC 30 can further include one or more temperature sensors, humidity sensors, electromagnetic field sensors, current/voltage/power sensors, light sensors, chemical sensors (e.g., for oxygen, carbon monoxide, carbon dioxide, nitrogen oxides, sulfur dioxide and/or trioxide, ozone, one or more toxins, etc.). The present IC 30 may also include one or more time sensors (e.g., configured to count or determine elapsed time), including the clock circuit 150 (which can be a basis for a real-time clock) and one or more counters, dividers, etc., as is known in the art. The leads from any external sensing mechanism should be connected to the IC 30 at terminals separate from those for the antenna 20 and the continuity sensor (e.g., 210 in FIG. 4). Such sensors should be on the same part 12 of the tag substrate (and the package or container) as the antenna 20 and the IC 30.

Figures 2A, 2B, 2C:
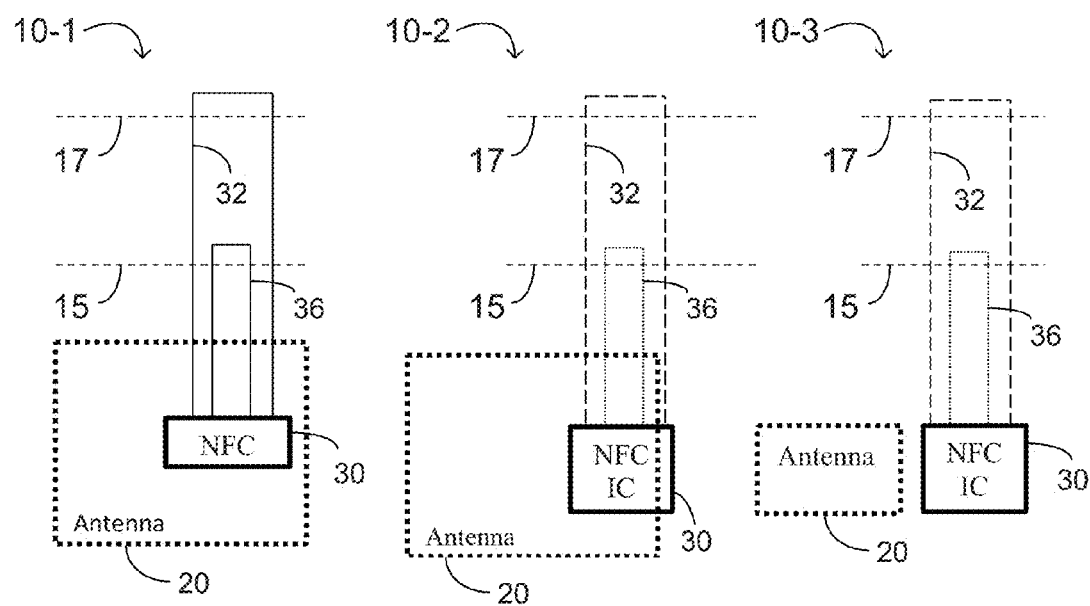
FIGS. 2A-C show other exemplary NFC/RF tags with protection lines for sensing whether a container bearing the tag has been opened, in accordance with one or more embodiments of the present invention.

FIGS. 2A-C shows several alternative layouts for the relative positions of the IC 30 and the antenna 20 in the present NFC/RF tag. For example, in a first embodiment 10-1, the antenna 20 can completely overlap the IC 30. In such an embodiment, the IC 30 can be formed by thin film deposition and patterning techniques and/or printing on a thin, optionally flexible substrate (e.g., an interposer) that is used to extend over the loops of a spiral antenna and bridge the ends of the antenna 20, on which traces or pads can be formed to electrically connect the ends of the antenna 20 to the IC 30 (see, e.g., U.S. patent application Ser. No. 11/243,460, filed 3 Oct. 2005, the relevant portions of which are incorporated herein by reference). Such an embodiment 10-1 advantageously employs a single-layer spiral antenna. In an alternative embodiment 10-2, the antenna 20 can partially overlap the IC 30. This layout/embodiment 10-2 may be advantageous when the antenna 20 has a serpentine pattern, in which the two ends of the antenna 20 can be in the same (relatively small) area of the substrate, enabling facile attachment of the IC 30, directly or using pads or traces. In a third embodiment 10-3, the antenna 20 and the IC 30 do not overlap at all. Traces (e.g., traces 25 shown in FIG. 1) are necessary to connect the ends of the antenna 20 to the IC 30 in such a case, but electrical interference between the antenna 20 and the IC 30 is minimized or avoided in this embodiment 10-3.

Also, FIGS. 2A-C illustrate use of multiple protection lines to sense continuity in more than one location or interface of the container. For example, some containers include flip-open lids that also function as caps, and vice versa. Also, overnight delivery boxes and envelopes frequently include a string, filament or strip of durable or resilient material offset from an edge or crease in the package, to facilitate opening the package. However, some users find it easier and/or more effective to open the package along the fold between sides of the package (e.g., using a knife, letter opener, box cutter, one or more fingers, etc.). The tags or devices in FIGS. 2A-C include two protection lines (PL) 32 and 36 to sense opening the container or package along either of two interfaces 15 or 17. The first (e.g., outer) protection line 32 senses continuity of the container or package along the farthest interface 17 of the two interfaces, and the second (e.g., inner) protection line 36 senses continuity of the container or package along the nearest interface 15 of the two interfaces. However, other arrangements and/or patterns for the protection lines 32 and 36 (e.g., left and right, upper and lower/top and bottom, etc., rather than inner and outer) can be envisioned and implemented without inventive activity by those skilled in the art.

The present tag/device is significantly more useful and has a longer lifespan than conventional implementations, and at minimal added cost. Since the additional conductive lines can be printed or etched on the same substrate as the antenna coil, the only additional cost may be due to the additional size of the antenna+protection line design. However, due to the very low cost of the antenna substrate and processing, cost increases are likely to be on the order of tenths of a cent.

In this solution, the NFC feature (i.e., wireless read function) is always available, regardless of whether the product in which the NFC tag is integrated is in an unopened or opened state. This contrasts with traditional implementations, where the antenna is permanently broken, and the tag is therefore unreadable, after a container has been opened. In this new implementation, because the antenna lines are intact, and only the continuity sensor lines are broken upon opening of the protected product, the NFC data will indicate to the reader (smartphone, USB reader, etc.) not only the unique ID number of that NFC and/or RFID tag (which can be used for everything from mobile marketing, loyalty, discounts/cross-sell offers to supply chain tracking, tax tracking for governments, specific product manufacturing information such as lot no., manufacturing date, etc.), but also whether the protected product is factory sealed/unopened (and therefore contains genuine product) or has been opened (and therefore contents suspect if delivered to the consumer in that state). Thus, in some embodiments, it may be beneficial to locate the antenna (and optionally, the IC) a sufficient distance away from the interface between the two parts of the container to reduce or minimize the risk of inadvertent damage to the antenna (and optionally the IC) from opening the container.

By preserving the ability to read the tag both before opening and after opening (with the added dimension of reading whether the container has been opened), it is possible to continue NFC-based interaction(s) with the user after the product has been opened. For example, pharmaceuticals, cosmetics, certain alcoholic beverages, and even food products like olive oil can be opened and used for days, weeks, months, or even years. By preserving the functionality of the NFC and/or RFID tag during this time, the consumer can communicate with the manufacturer regarding the specific product bearing the NFC tag.

Applications that read NFC and/or RFID tags are generally connected to cloud servers that collect information about the IDs that are read. This is to log data for analysis and to serve the correct experience and/or provide accurate information to the consumer's smartphone or other NFC- and/or RF-capable device. When the ID indicating an 'opened' state is first read and processed by the cloud system, it will automatically trigger alerts (and potentially trigger investigation) if that ID is ever read again in the 'closed' state. That helps to ensure the integrity of the overall system. This function and/or use is not possible in traditional methods where the NFC and/or RF antenna is destroyed when the container is opened.

In addition, because the state of the NFC and/or RFID tag's data will change upon opening the protected product, NFC and/or RF devices (e.g., readers) and/or cloud systems can recognize this change in state and provide a differentiated experience when users interact with the NFC and/or RFID tag attached to the protected product or package after opening. For example, a closed product might trigger a consumer and/or user experience related to the evaluation and purchase of the product (e.g., in a retail environment), while an opened product might trigger information about how to properly use the product (e.g., by providing recipes in the case of food products, expiration dates and/or special instructions for use in the case of pharmaceutical products, etc.) and/or opportunities to instantly order related products or to reorder the same product, etc.

The conductive protection lines are identifiable as sealed (intact) or opened (broken). They are broken when the package is opened, and the scored lines destroy the electrical connection of the protection line(s). The lines ideally are small (to minimize the overall size and cost of the label) and constructed in such a way that they are impossible to reconnect once broken. In some cases (e.g., FIG. 1), multiple protection lines (or sets of protection lines) may be implemented for redundancy. Each line is allocated its own 'bit' in the dynamic sensor portion of the NFC and/or RFID IC memory space.

A more complex implementation could be used for applications in which breaking a continuity sensing (protection) line causes many or all bits of NFC data to be changed. This can be done in a predictable way, such as a shift, XOR or other known function, or it can be done in an unpredictable way (such as a complete replacement of a random ID with a completely different random 'opened' ID that is linked to the 'closed' ID ONLY in the private cloud database maintained by the brand owner and not accessible to the public). These functions make the tags even more difficult to copy. Of course, CRC integrity in the NFC and/or RFID tag data stream should be preserved.

A particularly high security version of this implementation involves a completely random pair of IDs, one representing 'opened' and one representing 'closed', with the association known only in the database managed by the brand owner or the manager of the protection system. This system is particularly valuable because the 'opened' value could never be determined from only the 'closed' value, and the 'closed' value could never be determined from only the 'opened' value. When read by the NFC phone and associated application before and after opening, the different IDs will be decoded by the cloud database to record whether that protected product is currently in the 'opened' or 'closed' state. First, that makes duplication of the IDs extremely difficult, because a set of valid 'opened' IDs could not be skimmed by simply systematically reading 'closed' stock on the shelf. Keep in mind that when scanned, the consumer will receive some information about the validity of the product. Say we have product with serial number #0210 in the field. The Closed ID is ID-A, and the Open ID is ID-B. If the cloud system receives ID-A from the system, followed by ID-B, from the same phone, it can infer that the same user opened item #0210. However, if the system receives a read of ID-A after a read of ID-B, then something is wrong because those IDs are assigned only to item #0210 and it is impossible for the 'closed' ID to be read after the item was permanently physically altered by breaking the protection lines and shifting the NFC and/or RFID tag to the 'opened' ID. This could mean that an ID was cloned—and the user/brand owner/distributor/retailer (as appropriate) can be alerted and details tracked to isolate fraud and other supply chain disruptions. Such general fraud detection concepts may be similar to those used when developing rules to detect credit card fraud (e.g., a card is read in Florida, and a few minutes later is read in London, so a fraud alert is triggered).

Furthermore, the use of two completely random IDs can overcome a situation where malicious actors try to trigger IDs as 'opened' so as to undermine the system. This is impossible when the 'opened' ID cannot be easily derived from the 'closed' ID. This provides another layer of fraud resistance in the system.

The NFC label can be combined with tamper evident adhesives and paper for an extra layer of security. In this way, the consumer, retailer, distributor, or brand representative will have a visual indication of whether the label has been tampered with.

The antenna can be printed (e.g., using printed conductors such as, but not limited to, silver from a silver paste or ink) or manufactured using conventional methods like etched aluminum (e.g., by sputtering or evaporating aluminum on a substrate such as a plastic film or sheet, patterning by low-resolution [e.g., 10-1,000 μm line width] photolithography, and wet or dry etching). Some or all portions of the protection lines may be patterned on the opposite side of the substrate material from the main coil, in order to electrically isolate them from each other. The antenna can be sized and shaped to match any of multiple form factors, while preserving compatibility with the 13.56 MHz target frequency of the NFC reader hardware.

The invention can be applied broadly to all RFID tags (not just HF/NFC/13.56 MHz tags), including RFID tags operating at frequencies higher or lower than 13.56 MHz, especially in the case where the RFID tag has the ability or functionality to accept external sensor input(s) and communicate the same when read by an RFID reader adapted to read such a tag.

An Exemplary Method of Making a Wireless Communication Device

The present invention also concerns a method of manufacturing a wireless communication device, comprising forming an antenna on a first substrate, forming one or more protection lines on a common or different substrate (i.e., the first substrate or a second, different substrate), forming an integrated circuit (IC) on a substrate, and electrically connecting (i) the antenna to a first set of terminals of the IC and (ii) the protection line(s) to a second set of terminals of the IC. The IC substrate may be common with the substrate on which the antenna and/or the protection line(s) are formed (i.e., the first substrate or, when present, the second substrate). Alternatively, the IC substrate may be different from the substrate on which each of the antenna and the protection line(s) are formed (i.e., a second substrate when the antenna and the protection line[s] are formed on the same [e.g., first] substrate, or a third substrate when the antenna and the protection line[s] are formed on different substrates). The antenna is configured to receive and/or transmit or broadcast a wireless signal.

In various embodiments, the wireless communication device comprises a near field or radio frequency communication device. In one example, the device is an NFC device, such as an NFC tag.

Some embodiments of the method of making a wireless communication device may comprise making a plurality of protection lines. Additionally or alternatively, the method may further comprise forming one or more redundant protection lines, as described herein. The redundant protection line(s) may be formed on the same substrate as the protection line(s).

In the present method of making a wireless communication device, forming the integrated circuit may comprise printing one or more layers of the integrated circuit. Printing offers advantages over photolithographic patterning processes, such as low equipment costs, greater throughput, reduced waste (and thus, a "greener" manufacturing process), etc., which can be ideal for relatively low transistor-count devices such as near field, RF and HF tags. Thus, in some cases, the method may comprise printing a plurality of the layers of the integrated circuit.

Alternatively, the method may form the integrated circuit by a process that comprises forming a plurality of layers of the integrated circuit by one or more thin film processing techniques. Thin film processing also has a relatively low cost of ownership, and is a relatively mature technology, which can result in reasonably reliable devices being manufactured on a wide variety of potential substrates. In some embodiments, the best of both approaches can be used, and the method may form one or more layers of the integrated circuit by one or more thin film processing techniques, and printing one or more additional layers of the integrated circuit.

In some embodiments, forming the antenna may consist of forming a single metal layer on the first substrate, and etching the single metal layer to form the antenna. Alternatively, forming the antenna may comprise printing a metal ink on the first substrate in a pattern corresponding to the antenna. In some relatively advantageous embodiments, the antenna and the protection lines consist of a single common metal layer on a common substrate. Alternatively, the antenna may consist of a first patterned metal layer on a first surface of the common substrate, and the protection lines may consist of a second patterned metal layer on a second surface of the common substrate opposite from the first surface.

As described herein, the integrated circuit generally comprises a sensor. Consequently, electrically connecting the protection line(s) to the integrated circuit comprises electrically connecting the protection line(s) to the sensor. Furthermore, the integrated circuit may further comprise a threshold comparator configured to receive an output of the sensor, a memory including one or more bits configured to store a value corresponding to a continuity state of the container or package, and/or any of the other circuits or circuit blocks disclosed herein. For example, the memory may include a plurality of bits configured to store a unique identification code for the container or package. In such a case, forming the memory may comprise printing at least one layer of the memory that includes the plurality of bits configured to store the unique identification code.

An Exemplary Method of Using a Wireless Communication Device to Detecting an Opened Package or Container The present invention further concerns a method of detecting an opened package or container, comprising placing a wireless communication device comprising an antenna, one or more protection lines, and an integrated circuit electrically connected to each of the antenna and the protection line(s) on the package or container, and sensing a continuity state of the package or container using the integrated circuit. In various embodiments, the wireless communication device comprises a near field and/or radio frequency communication device, such as an NFC tag.

As described herein, the package or container has first and second separable parts, and the wireless communication device is placed on the package or container such that at least one protection line is over an interface between first and second separable parts of the package or container. As described herein, the integrated circuit and the antenna are generally on the first separable part of the package or container, and the protection line(s) are on each of the first and second separable parts of the package or container, thereby ensuring that the protection line(s) are broken upon opening the package or container. Thus, the continuity state of the package or container may be "opened" when at least one protection line over the interface between the separable parts of the package or container is broken. Similarly, the continuity state of the package or container may be "closed" or "sealed" when the protection line(s) over the interface is/are not broken.

As for other aspects of the invention, the wireless communication device may comprise a plurality of the protection lines and/or one or more redundant protection lines. In such embodiments, the package may be considered opened when one of the protection lines is broken or severed, when all of the protection lines are broken or severed, or when any number of protection lines between one and all are broken or severed. Furthermore, in a multi-compartment package such as a blister pack, each of the plurality of protection lines may extend over a unique one of the multiple sealed or closed compartments of the package. When the wireless communication device includes one or more redundant protection lines, the redundant protection line(s) may be on the same substrate as the protection line(s).

As described elsewhere herein, the integrated circuit may comprise one or more printed layers, a plurality of thin films, or one or more thin films and one or more printed layers. The antenna may consist of single metal layer. The antenna and the protection lines may consist of a single common metal layer on a common substrate, or separate single metal layers on opposite surfaces of a common substrate.

The integrated circuit generally further comprises a sensor electrically connected to the one or more protection lines. The integrated circuit may further comprise a threshold comparator receiving an output of the sensor, a memory including one or more bits configured to store a value corresponding to the continuity state of the container or package, and/or any other circuit or circuit block disclosed herein. In some examples, the memory includes a plurality of bits configured to store a unique identification code for the container or package. In such examples, the memory may comprise at least one printed layer in the plurality of bits configured to store the unique identification code.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A wireless communication device, comprising:
   a) a receiver and a transmitter;
   b) a substrate with an antenna thereon, the antenna receiving a first wireless signal and transmitting or broadcasting a second wireless signal;
   c) an integrated circuit comprising (i) a continuity sensor and (ii) a memory, the integrated circuit being electrically connected to the antenna and configured to (i) process the first wireless signal and/or information therefrom, and (ii) generate the second wireless signal and/or information therefor; and
   d) one or more protection lines on a common or different substrate, the protection line(s) being (i) configured to sense or determine a continuity state of a package or container on which the communication device is placed or to which the communication device is fixed or adhered, and (ii) electrically connected to the continuity sensor,
   wherein:
      the memory includes one or more bits storing a value corresponding to the continuity state of the container or package,
      breaking at least one of the one or more protection lines causes at least one of the one or more bits to change,
      the second wireless signal communicates the value corresponding to the continuity state of the container or package, and
      the wireless communication device is configured such that it and/or a cloud system connected to it recognizes a change in the value of the continuity state and provides (i) a first consumer and/or user experience through the wireless communication device when the value of the continuity state of the container or package corresponds to a closed or sealed continuity state and (ii) a different consumer and/or user experience through the wireless communication device when the continuity state of the container or package corresponds to an opened continuity state.

2. The wireless communication device of claim 1, wherein the one or more protection lines comprises a plurality of the protection lines.

3. The wireless communication device of claim 1, wherein the integrated circuit comprises one or more printed layers and one or more thin films.

4. The wireless communication device of claim 1, wherein the antenna and the one or more protection lines consist of a single common metal layer on a common substrate.

5. The wireless communication device of claim 1, comprising a near field communication (NFC) and/or radio frequency communication device.

6. The wireless communication device of claim 5, configured to communicate with an NFC-capable reading device.

7. The wireless communication device of claim 1, wherein the substrate comprises a plastic film or a plastic sheet that is scored to facilitate breaking the one or more protection lines when the container or package is opened.

8. The wireless communication device of claim 1, wherein the integrated circuit further comprises a threshold comparator configured to receive an output of the continuity sensor and having a comparator output that is stored in the memory.

9. The wireless communication device of claim 8, wherein the integrated circuit further comprises one or more bit lines for reading data from the memory, one or more sense amplifiers that convert signals on the one or more bit lines to digital signals, and one or more latches that temporarily store data from the one or more sense amplifiers.

10. The wireless communication device of claim 1, wherein the memory further comprises a first plurality of bits configured to store a unique identification code for the container or package, and a second plurality of bits configured to store overhead data.

11. The wireless communication device of claim 1, wherein the continuity state of the package or container is opened when at least one of the one or more protection lines is broken, the continuity state of the package or container is closed or sealed when each of the one or more protection lines is not broken, and the one or more bits storing the value corresponding to the continuity state of the container or package can be changed from a first value when the continuity state is closed or sealed to a second value when the continuity state is opened.

12. A package or container, comprising:
   a) first and second separable parts with an interface therebetween; and
   b) the wireless communication device of claim 1, on the first and second separable parts of the package or container, and over the interface.

13. The package or container of claim 12, wherein the integrated circuit and the antenna are on the first separable part of the package or container, and the one or more protection lines are on each of the first and second separable parts of the package or container.

14. A method of detecting an opened package or container, comprising:
   a) placing the wireless communication device of claim 1 on the package or container such that at least one of the protection line(s) are over an interface between first and second separable parts of the package or container; and
   b) using the integrated circuit, sensing a continuity state of the package or container.

15. The method of claim 14, wherein the wireless communication device comprises a near field communication (NFC) device, and sensing the continuity state of the package or container comprises communicating with the wireless communication device using an NFC-capable reading device.

16. The method of claim 14, wherein the integrated circuit and the antenna are on the first separable part of the package or container, and the one or more protection lines are on each of the first and second separable parts of the package or container.

17. A system, comprising:
   a) a package or container having the wireless communication device of claim 1 thereon, such that at least one of the protection line(s) are over an interface between first and second separable parts of the package or container; and
   b) a reader configured to transmit or broadcast the first wireless signal to the wireless communication device and receive the second wireless signal from the wireless communication device.

18. The system of claim 17, wherein the wireless communication device is an NFC device, and the reader comprises an NFC-capable reading device.

19. The system of claim 17, wherein the first consumer and/or user experience relates to evaluation and/or purchase of a product in the package or container, and the different consumer and/or user experience provides information about how to properly use the product and/or an opportunity to reorder the product or to order related products.

20. The system of claim 17, wherein the reader is connected to the cloud system and reads the value corresponding to the continuity state of the container or package from the wireless communication device, the cloud system serves the corresponding consumer and/or user experience to the reader based on the value corresponding to the continuity state of the container or package.

* * * * *